Oct. 26, 1965   R. P. CAPPS   3,214,099
MULTIPLE ZONE HEATING SYSTEM
Filed Sept. 5, 1962   5 Sheets-Sheet 1

INVENTOR
Randolph P. Capps

BY
Mason, Fenwick & Lawrence
ATTORNEYS

Oct. 26, 1965

R. P. CAPPS 3,214,099

MULTIPLE ZONE HEATING SYSTEM

Filed Sept. 5, 1962

INVENTOR
Randolph P. Capps

BY
Mason, Fenwick & Lawrence
ATTORNEYS

Oct. 26, 1965  R. P. CAPPS  3,214,099
MULTIPLE ZONE HEATING SYSTEM
Filed Sept. 5, 1962  5 Sheets-Sheet 4

INVENTOR
*Randolph P. Capps*

BY *Mason, Fenwick & Lawrence*
ATTORNEYS

Oct. 26, 1965   R. P. CAPPS   3,214,099
MULTIPLE ZONE HEATING SYSTEM
Filed Sept. 5, 1962   5 Sheets-Sheet 5

INVENTOR
*Randolph P. Capps*

BY *Mason, Fenwick & Lawrence*
ATTORNEYS

United States Patent Office 3,214,099
Patented Oct. 26, 1965

3,214,099
MULTIPLE ZONE HEATING SYSTEM
Randolph P. Capps, Lynchburg, Va., assignor to Multi-Zoner, Inc., Lynchburg, Va., a corporation of Virginia
Filed Sept. 5, 1962, Ser. No. 222,762
14 Claims. (Cl. 236—9)

The present invention relates to a temperature control system for a plurality of zones, and more particularly to temperature control for a heating, ventilating or air conditioning system serving a plurality of zones, each having temperature responsive means for controlling the quantity of a heating or cooling medium furnished to the respective zones.

This application is a continuation-in-part of my abandoned prior application 179,526 filed March 9, 1962, which in turn is a continuation-in-part of my abandoned prior application 100,146 filed April 3, 1961.

It has been previously recognized that more advantageous heating and air conditioning of a structure, such as office, factory and dwelling space, may be achieved by separating areas of the structure into a plurality of zones each provided with a thermostat or other temperature responsive device to regulate the flow of the heating or cooling medium to their respective zones. This is particularly desirable in office and manufacturing buildings, duplex houses, small apartments, split-level houses, and the like where temperature requirements or heat loads may vary considerably. Systems heretofore devised to provide zonal heat or air-conditioning control have usually been quite complex and expensive. For example, it has been previously proposed to provide a damper for each air distribution duct leading to a discharge register, which is controlled by a thermostat in the room served by the register, to automatically regulate the heating or cooling air discharged from the register. Not only is such a system expensive due to the large number of dampers, damper adjusting motors, and thermostats required, but problems are introduced when all of the dampers are closed and the furnace or air-conditioner blower is still operating, a condition which often occurs since the blower is usually denergized by the bonnet thermostat or other means independent of the temperature in the rooms served. Attempts have been made to alleviate this problem by providing a by-pass duct which returns air from the bonnet directly back to the blower inlet when all of the dampers are closed, resulting in a waste of heated air.

An object of the present invention therefore is the provision of a simple and inexpensive temperature control means for heating systems, air-conditioning systems, and the like, for regulating distribution of the heating or cooling medium to separate zones in accordance with the desired temperature in the respective zones.

Another object of the present invention is the provision of a novel multi-zone heating or air-conditioning system wherein damper means under control of a plurality of temperature responsive devices in the zones to be served are provided for regulating distribution of the heating or cooling medium to the zones.

Another object of the present invention is the provision of a novel mutli-zone heating or air-conditioning system wherein damper means under control of a plurality of temperature responsive devices in the zones to be served are provided to assume positions which will direct the heating or cooling medium solely to any selected one of the plurality of zones or to all zones in selected proportions, or to any intermediate number of zones.

Another object of the present invention is the provision of novel control means for a conventional electric motor of the type having an internal cam, limit switches and a relay to make the armature and windings instantly reversible and establish two opposite angular limit positions, wherein the novel control means causes the motor to assume a selected intermediate angular position between the customary two opposite angular limit positions from either of the two limit positions responsive to selected signals.

Other objects, advantages and capabilities of the present invention will become apparent from the following detail description, taken in conjunction with the accompanying drawings illustrating three preferred embodiments of the invention.

In the drawings:

FIGURE 6 is a diagrammatic view of an exemplary physical arrangement of the damper control motor and a commutator and relay assembly for controlling the same which may be used in the system of FIGURE 5;

In the accompanying drawings, the invention is illustrated in conjunction with hot air heating systems, it being understood that the present invention may be applied with equal facility to air conditioning or other air handling systems.

Figure 1:
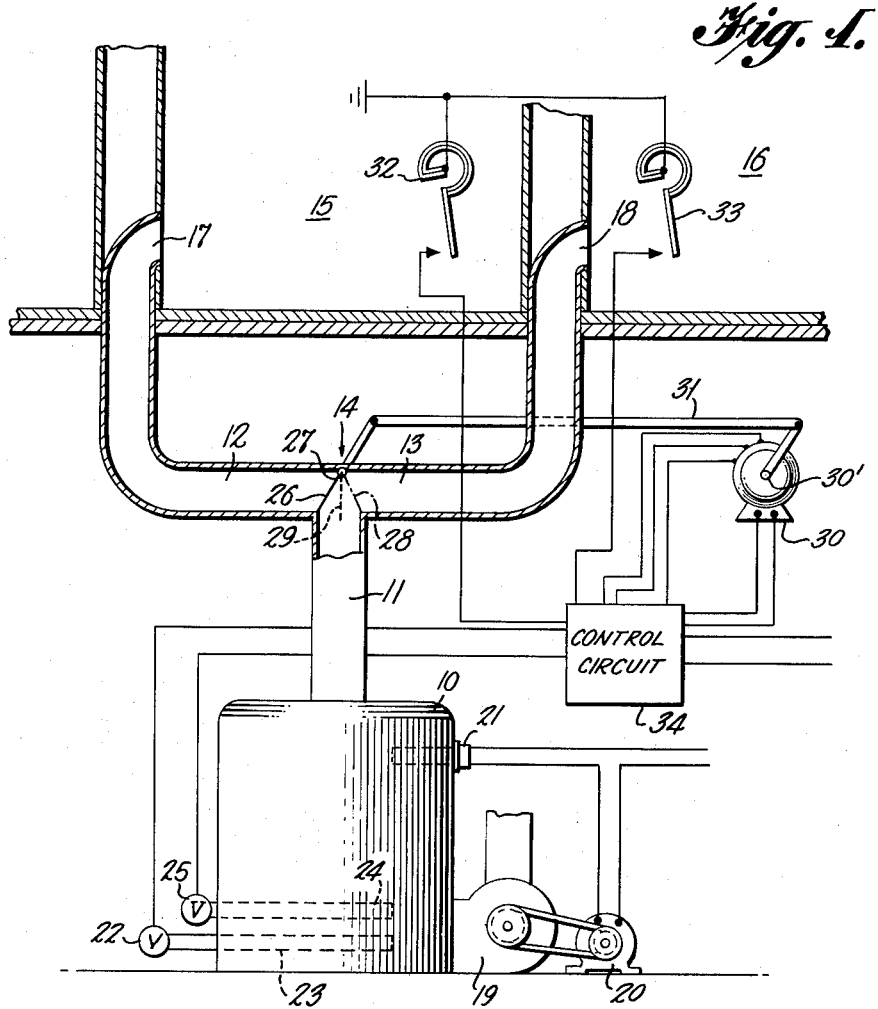
FIGURE 1 is a diagrammatic illustration of a zone control system embodying one form of the present invention.

Referring to FIGURE 1, a furnace 10 of generally conventional construction having the usual combustion chamber and a bonnet or plenum chamber in heat exchange relation therewith, has a main warm air discharge duct 11 for supplying heated air to a dwelling having a plurality of zones to be independently thermostatically controlled. Branch air delivery ducts 12 and 13 communicating with the main air delivery duct 11 at the junction zone 14 deliver air to the rooms or zones 15, 16 through the usual discharge openings or registers 17, 18. Air returns from these zones 15, 16 in a conventional manner by return air ducts, not shown, to a blower 19 driven by a blower motor 20. The blower motor 20 is connected to a source of power through a blower control switch 21, for example of the thermostatic type, which is responsive to temperature in the bonnet of the furnace to energize the blower motor 20 when the bonnet temperature reaches a first selected level and to deenergize the blower motor 20 when the bonnet temperature falls below another selected temperature level. The switch 21 also exercises a measure of control over burner regulating valve 22 controlling the supply of fuel to furnace burner 23 to terminate fuel supply to the burner 23 when the bonnet temperature reaches a selected level provided the valve 22 has not been previously closed by means responsive to the temperatures in the zones served by the furnace. To this end the switch 21 may include contacts operating in a manner similar to switch 51 disclosed in Nessell Patent Number 2,244,631 or in Grant Patent Number 2,271,120. Optionally, a second stage furnace burner 24 may be provided in the furnace 10, in which event its fuel regulating valve 25 is also subject to control by the switch 21 in the same manner as the fuel regulating valve 22.

The flow of heat from the furnace 10 to either or both zones 15, 16 is controlled by a damper 26 supported on a pivot shaft 27 in the junction zone 14 for movement between a first position illustrated in solid lines in FIGURE 1 wherein all of the heated air is delivered to the zone 16, a second position illustrated in dot-dash lines and indicated by the reference character 28 wherein all of the heated air is delivered to the zone 15, and an intermediate position indicated by the dash-line 29 wherein the heated air is equally distributed between the zones 15 and 16 or is distributed in some other selected proportion to the two zones.

The position of the damper 26 is determined by an electric damper control motor 30, the shaft 30' of which is interconnected with the pivot shaft 27 of the damper 26 by linkage 31 to continuously position the damper 26 in accordance with the angular position of the shaft of the damper control motor 30. The motor 30 in one satisfactory embodiment is a conventional reversible electric motor of the type having internal cams, limit switches, and a relay to reverse the armature or windings to make the motor instantly reversible to esatblish two opposite angular limit positions, which motor has been modified as described hereafter to cause the motor to assume a selected intermediate position from either of the limit positions responsive to demand by the signals. The damper control motor and the burner fuel regulating valve 22, or valves 22 and 25, are variously controlled by temperature responsive devices indicated by the reference charatcers 32 and 33, for example taking the form of conventional bi-metal thermostats, located respectively in the zones 15 and 16 to sense the temperature level in their associated zones, and through a control circuit, indicated generally by the reference character 34 in FIGURE 1, to control the damper control motor 30 and fuel regulating valve 22 or valves 22 and 25.

Figure 2:
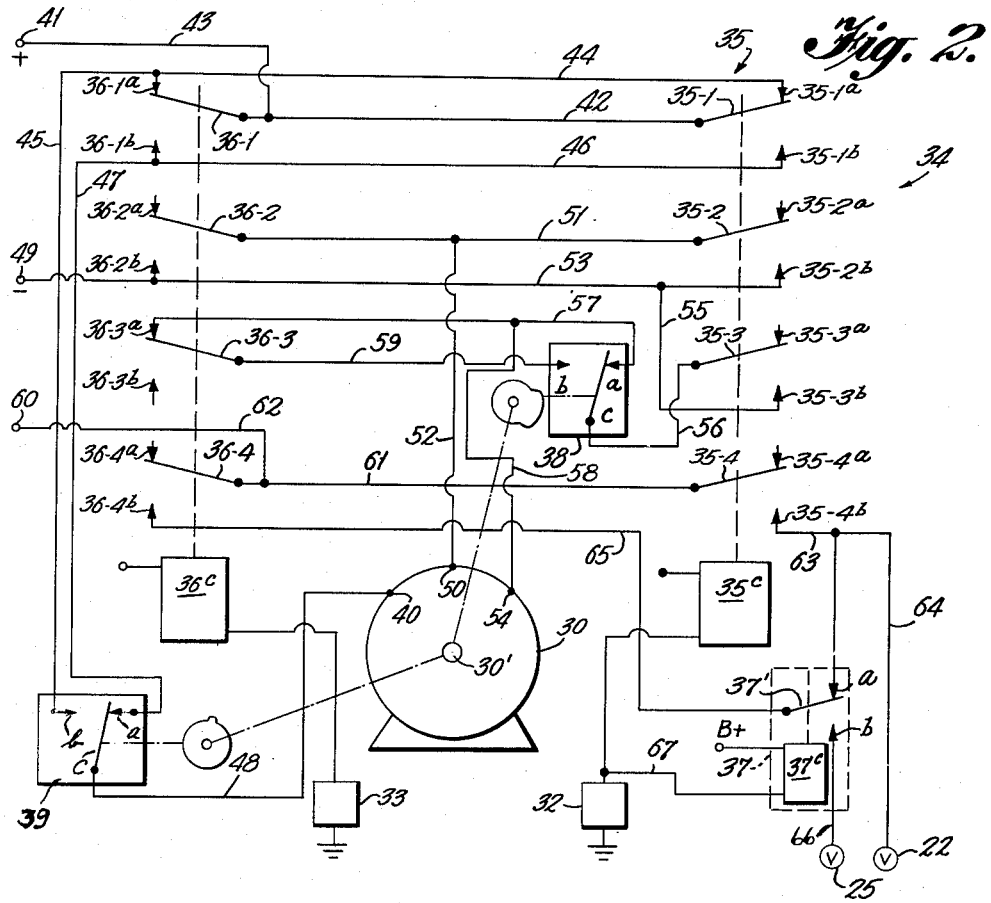
FIGURE 2 is a schematic diagram of an electric control circuit which may be used to provide the zone control system of the present invention.

One example of the suitable control circuit for regulating the damper control motor 30 and burner fuel valves 22, 25 in a two-stage burner installation is illustrated schematically in FIGURE 2. The control circuit 34 consists essentially of a first zone control relay 35 associated with the zone 15 and its thermostat 32, a second zone control relay 36 associated with the zone 16 and its thermostat 33, a stage relay 37 and a pair of cam actuated snapaction switches 38, 39. The first zone control relay 35 includes a coil 35c connected in series with the contacts of thermostat 32 for zone 15 across a suitable voltage source, and a plurality of movable relay contact arms 35–1, 35–2, 35–3 and 35–4 each associated with normally closed stationary contacts 35–1a to 35–4a respectively and normally open stationary contacts 35–1b to 35–4b respectively. Similarly, the second zone control relay 35 includes a relay coil 36c connected in series with the contacts of thermostat 33 in zone 16 across a suitable voltage source and a plurality of movable relay contact arms 36–1, 36–2, 36–3 and 36–4 associated with normally closed stationary contact 36–1a to 36–4a inclusive and normally open stationary contacts 36–1b to 36–4b inclusive. The first sets of relay contacts 35–1 and 36–1 and their associated stationary contacts control connection of a + terminal 40 of the electric motor 30 to the positive voltage terminal 41 of a suitable direct current source, the movable contact arms 35–1 and 36–1 being connected together by lead 42 and being connected by lead 43 to the positive voltage source terminal 41. The normally closed stationary contacts 35–1a and 36–1a are also connected together by lead 44 and are connected by common lead 45 to contact 39b of the cam controlled snapaction switch 39. Similarly the normally open stationary contacts 35–1b and 36–1b are connected together by lead 46 which is in turn connected by lead 47 to stationary contact 39a of the cam controlled snapaction switch 39. The movable contact arm 39c of the snapaction switch 39 is connected by lead 48 with the B+ motor terminal 40.

To convert the two-position reversible motor 30 to a three-position motor, the cam controlled snapaction switch 39 is provided which is responsive to the position of the shaft 30' of the motor 30 and therefore of the damper 26 connected therewith. The snapaction switch 39 is controlled by a cam on the shaft of the motor 30 in such a manner that the movable contact arm 39c engages the stationary contact 39a at all positions of the motor shaft except the selected intermediate position, the movable contact arm 39c being shifted for a very short angular period when the motor shaft is precisely at the intermediate position into engagement with the normally open stationary contact 39b. For example, if it be assumed that the total range of rotation of the shaft 30' of motor 30 be 90°, movable contact arm 39c would engage the stationary contact 39b only when the motor shaft is at the 45° position intermediate the two limit positions, the contact arm 39c being in engagement with the normally closed stationary contact 39a at all other angular positions within the 90° range.

The movable contact arms 35–2 and 36–2 control application of negative voltage from the terminal 49 of the D.C. voltage source to the — terminal 50 of the motor 30, the contact arms 35–2 and 36–2 being connected together by lead 51 and connected with the — motor terminal 50 by lead 52, and the normally open stationary contacts 35–2b and 36–2b being connected together by lead 53 to the negative supply voltage terminal 49.

The sets of contacts associated with the relay contact arms 35–3 and 36–3 provide direction control for the electric motor 30 by regulating the application of voltage from the negative voltage terminal 49 to the direction control terminal 54 of the motor 30. The motor 30 in this embodiment is of the commerically known type having a built-in reversing relay which controls application of supply voltage to directional windings to effect substantially instantaneous reversal of the motor direction. The stationary contact 35–3b of the control relay 35 is connected by lead 55 to lead 53 communicating with the negative voltage supply at terminal 49. The movable contact arm 35–3 is connected by lead 56 to movable switch arm 38c of the cam actuated snapaction switch 38 having stationary contacts 38a and 38b. The switch arm 38c is positioned by a cam or cams on the shaft 30' of the electric motor 30 to engage the stationary contact 38a when the shaft 30' is in its clockwise limit position corresponding to the position assumed by the damper 26 to close off the duct to zone 15 and admit all the heated air to zone 16, and for half the total range of angular movement of the shaft 30' from its clockwise limit position, and to shift the switch arm 38c into engagement with contact 38b when the shaft 30' is at its counterclockwise limit position and over the adjacent half of the range of movement of the motor shaft. Lead 57 connects switch contact 38a with stationary contact 36–3a, lead 57 being in turn connected by lead 58 with the reversing terminal 54 of the motor 30. Switch contact 38b is connected by lead 59 to the movable relay contact arm 36–3.

The sets of contacts associated with the control relay contact arms 35–4 and 36–4 control application of voltage from the supply terminal 60 to the burner fuel regulating valves 22 and 25. The relay contact arms 35–4 and 36–4 are connected together by lead 61 which is in turn connected through lead 62 to the supply terminal 60. Stationary contact 35–4b is connected by lead 63 to normally closed stationary contact 37a of stage relay 37 and through lead 64 to the first stage burner fuel regulating valve 22. Stationary relay contact 36–4b is connected by lead 65 to the movable contact arm 37' of stage relay 37, and the normally open contact 37b of stage relay 37 is connected by lead 66 to the second stage burner fuel regulating valve 25. The relay coil 37c of the stage relay 37 is connected at one end to a suitable positive voltage supply and at the other end through lead 67 to thermostat 32 sensing the temperature in zone 15.

In the operation of the above-described exemplary control circuit 34, assuming that heat is demanded in the zone 15 signaled by closing of the circuit through the contacts of the thermostat 32, the coil 35c of the control relay 35 is energized, drawing down the movable contact arms 35–1 to 35–4 into engagement with the "b" contacts. Assuming that the damper 26 is in the solid line position shown in FIGURE 1 wherein all of the heated air is being directed to the zone 16, the arms 38c and 39c of switches 38 and 39 will be in engagement with the contacts 38a and 39a respectively. Engagement of relay contact arm 35–1 with contact 35–1b will complete the + circuit to the terminal 40 of the motor 30 through leads 43, 42, 46 and 47, contact 39a and arm 39c of switch 39 and lead 48. Engagement of relay contact arm 35–2 with contact 35–2b completes the — circuit to terminal 50 of the motor 30 through leads 53, 51 and 52. Engagement of contact arm 35–3 with contact 35–3b completes the circuit from the negative supply terminal 49 to the reversing terminal 54 of the motor 30 through leads 53, 55 and 56, arm 38c and contact 38a of switch 38, and leads 57 and 58. Engagement of contact arm 35–4 with contact 35–4b completes the energizing circuit to first stage burner regulating valve 22 from supply terminal 60 through leads 62, 61, 63 and 64. The connection of the reversing terminal 54 of the motor 30 with the negative voltage supply terminal 49 energizes the relay within the motor 30 to switch the supply from the + and — terminals 40 and 50 to the armature and windings in such a way as to cause the motor shaft to rotate in a counterclockwise direction shifting the damper 26 to the positions indicated by the dot-dash line 28 in FIGURE 1 to direct the heated air from the furnace 10 from the duct 12 to the zone 15. The supply circuit to the motor 30 is not interrupted when the motor shaft 30' passes through the intermediate or 45° position although the switch arm 39c momentarily shifts into engagement with the contact 39b since the control relay 36 is deenergized and + voltage is available to the motor 30 through the relay contact arm 36–1 and stationary contact 36–1a.

If the damper 26 was already in the position indicated by the line 28 to direct air to the zone 15 when further heat was demanded by the thermostat 32, shifting of the relay contact arms 35–1, 35–2, 35–3 to the down position would have no effect on the motor unit by the cam actuated limit switches provided therein to terminate power supply to the motor when the shaft achieves the selected limit positions. Contact arm 35–4 would still be effective, however, to complete the supply circuit to the burner fuel regulating valve 22 firing the burner 23.

If the damper 26 was in the originally assumed solid line position illustrated in FIGURE 1 and both thermostats 32 and 33 demanded heat, engagement of their associated contacts "b" by the relay contact arms 35–1, 35–2, 36–1 and 36–2 would only produce parallel + and — supply circuits to the motor 30. Relay contact arm 35–3 would operate in the same manner described above to supply voltage to the reversing terminal 54 of the motor 30 and engagement of the contact arm 36–4 with the stationary contact 36–4b would complete a supply circuit from the supply terminal 60 through lead 65 to the contact arm 37' of stage relay 37. Since stage relay arm 37' is pulled down into engagement with the stationary contact 37b by energization of the coil 37c upon closure of the contacts of thermostat 32, voltage will be supplied to the second stage burner fuel regulating valve 25 in addition to the energization of the valve 22 to fire both burners 23 and 24. When the shaft of the motor 30 passes through the intermediate or 45° position during its counterclockwise travel, the + supply to the terminal 40 will be broken since the switch arm 39c will be shifted into momentary engagement with the stationary contact 39b and neither of the relay contact arms 35–1 nor 36–1 will be engaging the stationary contact 35–1a or 36–1a which normally provides + supply to the switch contact 39b.

The operation of the circuit when thermostat 33 demands heat and thermostat 32 does not is similar to that described above when only thermostat 32 demanded heat, except that stage relay coil 37c remains deenergized and drawing down of the relay contact arm 36–4 into engagement with the contact 36–4b completes a supply circuit to only the first stage burner fuel regulating valve 22 when heat is required in zone 16 only, the supply circuit being from terminal 60 through lead 62, contacts 36–4 and 36–4b, lead 65, contacts 37' and 37a, and lead 64. It will be noted that no supply circuit from the negative voltage terminal 49 to the motor reversing terminal 54 is established when only the second zone control relay 36 is energized. This results in the motor 30 being driven in a clockwise direction by the supply to the motor terminals 40 and 50 unless this supply is interrupted by the limit switch responsive to the motor shaft already assuming the clockwise limit position.

It will be apparent that the above-described system makes use of the damper 26 in three positions by utilizing both faces or sides of the damper. One side of the damper is used to close the air duct 12 leading to the zone 15 leaving open the duct 13 to the zone 16, while the other face of the damper 26 closes the duct 13 and leaves open the duct 12 to the zone 15. The intermediate position of the damper 26 opens both ducts 12 and 13 to distribute air to both zones 15 and 16. The two thermostats 32 and 33 sensitive individually to the temperature in the zones 15 and 16 control the single damper 26 by the control circuit 34 and three-position electric motor 30, whereby heat may be instantly directed to either of the zones 15 and 16 or to both zones as determined by the thermostat settings. In the exemplary embodiment described above, the system utilizes two-stage heating units, the circuit connections effected by the control box 34 energizing the valve 22 to fire the burner 23 when heat is demanded in either the zone 15 or the zone 16 alone. When heat is demanded in both zones 15 and 16, both of the valves 22 and 25 are open to fire the burners 23 and 24. As previously described, when the temperature in the bonnet for the furnace 10 rises to a certain preselected first temperature setting of the blower control switch 21, the blower motor 20 will be energized to drive the blower 19 and circulate air through the ducting system. After the burner regulating valves 22 and 25 are closed by deenergizing of both relays 35 and 36 in the control box 34, the blower motor 20 will continue to operate the blower 19 until the bonnet temperature falls below the preset cut-off level established by adjustment of the switch 21.

While the exemplary embodiment described above and illustrated in FIGURE 2 employs a two-stage burner, it will be apparent that a single-stage burner may be used to supply heat to both zones, in which event the stage relay 37 may be eliminated and the relay stationary contacts 35–4b and 36–4b connected together to the single burner fuel regulating valve, for example the valve 22. It will also be apparent that a multi-contact relay having five sets of contacts, each comprising a movable contact arm and an associated pair of stationary contacts, may be substituted for the relay 35, when a two-stage burner is used, in which event the stage relay 37 can be eliminated. In such a case, the fifth set of contacts of this relay will be connected in the control circuit in precisely the same manner as the contact arm 37' and contacts 37a and 37b of the stage relay 37.

Figure 3:
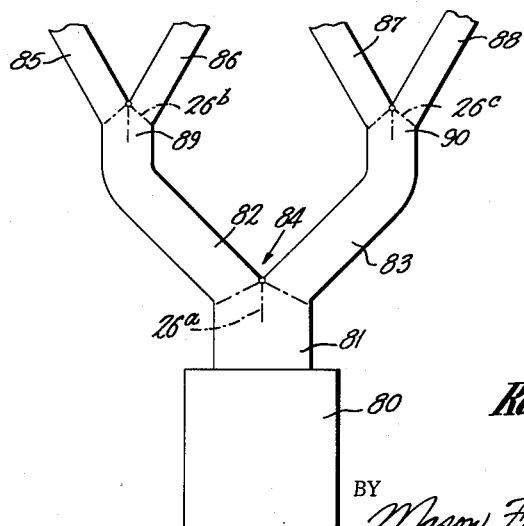
FIGURE 3 is a diagrammatic illustration of another form of zone control system embodying the present invention.

It will be further apparent that multi-zone installations involving more than two zones may be provided employing the principles of the present invention. For example, control of a four-zone installation for heating or air-conditioning may be provided in the manner diagrammatically illustrated in FIGURE 3, illustrating a hot air heating system wherein the warm air discharged from the furnace 80 passes into a main duct 81 which subdivides into branch feeder ducts 82 and 83 at junction zone 84 and they in turn subdivide into zone ducts 85, 86, 87 and 88 at junction zones 89 and 90. A damper 26a is provided at the junction zone 84 and similar dampers 26b and 26c are provided at the junction zones 89 and 90, each operating in a manner similar to the damper 26 employed in the first-described embodiment. In such a case, the damper 26b will be adjusted in response to signals from thermostats in each of the zones served by the ducts 85 and 86, while the damper 26c will be adjusted in response to signals from thermostats in the zones served by ducts 87 and 88. Damper 26a will be shifted to one limit position when a thermostat in the zones served by branch duct 82 demands heat or to the other limit position when a thermostat in the zones served by branch duct 83 demands heat. Damper 26a will assume an intermediate position when at least one thermostat in the zones supplied by branch duct 82 and one thermostat in the zones supplied by branch duct 83 demands heat.

While the preceding embodiment is directed to a control system for the damper 26 wherein the damper will either be disposed in the solid line position illustrated in FIGURE 1, or in the broken line position designated by the reference character 28 upon opening of the thermostat 32 or 33 following satisfaction of demand for heat by their respective zones, it may be desirable in some installations to arrange the system so as to return the damper to the intermediate position indicated by the broken lines 29 immediately upon opening of the thermostatic switch for the zone which had been demanding heat so that the residual heat forced from the bonnet of the furnace by the blower 19 following extinguishment of the burner or burners until the blower motor is deenergized by the thermostatic switch 21 will be distributed to all of the zones served by the furnace. Otherwise, when one of the thermostatic switches, for example the thermostat 32, opens signifying the damper in the surrounding zone has reached the setting of the thermostat, the damper 26 will remain at its adjusted position, for example as siginfied by the reference character 28, during the period the blower 19 is discharging the residual heated air from the bonnet of the furnace, so that all of this residual heated air will still be delivered to the zone 15, raising the temperature of the zone somewhat above the thermostatic setting. An exemplary circuit involving essentially the same circuit components illustrated in FIGURE 2 and described in the first embodiment is illustrated in FIGURE 4, wherein the reference characters are in the 100 series, the last last two digits of each reference character being the same as the reference characters employed in FIGURE 2 to designate corresponding components.

Figure 4:
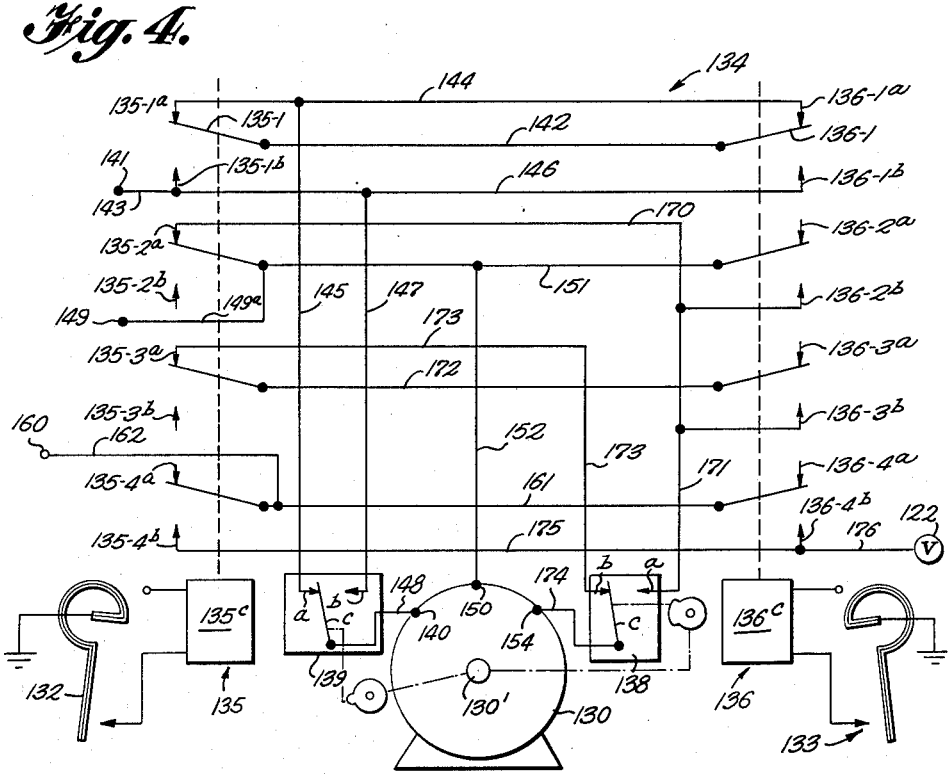
FIGURE 4 is a schematic diagram of an electric control circuit for providing a modified form of zone control wherein the distributing damper is automatically returned to an intermediate position distributing the heating medium to all zones as soon as the demands of a zone requiring heat are satisfied.

Referring to FIGURE 4, the control circuit 134 consists essentially of a first zone control relay 135 associated with the zone 15 and its thermostat 132, a second zone control relay 136 associated with the zone 16 and its thermostat 133, a pair of cam actuated snapaction switches 138, 139, each having a movable contact arm designated by the postscripts c and stationary contacts designated by the postscripts a and b. A damper control motor 130 having a shaft 130' and terminals 140, 150 and 154 corresponding to the terminals 40, 50 and 54 of the motor 30 in the first-described embodiment is controlled by the illustrated circuitry to effect adjustment of the damper 26. The zone control relays 135 and 136 are similar in construction to the relays 35 and 36 and have four sets of contacts including movable contact arms designated by the postscript numerals 1, 2, 3 and 4, normally closed stationary contacts designated by the postscript numerals 1a, 2a, 3a and 4a, and normally open stationary contacts designated by the postscript numerals 1b, 2b, 3b and 4b. The correspondence between the various contacts and contact arms of the zone control relays 135 and 136 and the relays 35 and 36 of the FIGURE 2 form will be apparent from inspection of the drawings. The normally closed stationary contacts 135–1a and 136–1a are connected together by the lead 144 which is in turn connected by lead 145 to the stationary contact 139a of the cam actuated snapaction switch 139. The movable contact arm 139c of this snapaction switch engages the stationary contact 139a when the motor shaft 130' occupies the center position between its two limits, disposing the damper 26 in the intermediate position 29a, the contact arm 139c being maintained by its cam in engagement with the stationary contact 139b at all other positions of the motor shaft. The movable contact 139c is connected by the lead 148 with the terminal 140 of the motor 130. The movable contact arms 135–1 and 136–1 are connected together by lead 142 and the normally open stationary contacts 135–1b and 136–1b are interconnected by lead 146 and are connected as through lead 143 to the terminal 141 which is herein designated by the positive supply terminal, lead 146 being also connected by lead 147 with the stationary snapaction switch contact 139b. Movable contact arms 135–2 and 136–2 are connected together by lead 151 which is connected through lead 152 to motor terminal 150 and is also connected by lead 149a to supply terminal 149, herein designated the negative supply terminal. While it is convenient to describe the system in connection with D.C. supply voltages, it will be apparent that a low voltage A.C. supply may be connected across the terminal 141 and 149. Stationary contacts 135–2a and 136–2b are idle and stationary contacts 135–2a and 136–2b are connected together by lead 170 which also connects with contact 136–3b and is connected through lead 171 with snapaction switch stationary contact 138a. The movable contact arms 135–3 and 136–3 are connected together by lead 172 and stationary contact 135–3a is connected by lead 173 to the stationary contact 138b of snapaction switch 138. The movable contact arm 138c is connected by lead 174 to the direction control terminal 154 of the motor 130, the normally closed stationary contacts 135–4a and 136–4a are idle, the movable contact arms 135–4 and 136–4 are connected together by lead 161 which connects through lead 162 to the supply terminal 160, and the normally open stationary contacts 135–4b and 136–4 are connected together by lead 175, which communicates through lead 176 to the burner control valve 122.

The snapaction switch 138 is similar in action to the switch 38 in the first-described embodiment in that it is positioned by a cam on the shaft 130' of the electric motor 130, the cam being arranged so that the movable contact arm 138c engages the stationary contact 138b at the clockwise limit of the shaft 130' and over slightly more than one-half of the range of arcuate movement of the shaft from the clockwise limit position, while the stationary contact 138a is engaged during the remaining range of positions of the shaft 130'. For example, if the shaft 130' has a 90° range, the contact 138b will be engaged by the arm 138c at the clockwise limit position and for approximately 50° in a counterclockwise direction, the stationary contact 138a being engaged during the remaining 40° range of shaft positions.

In the operation of this circuit, assuming that the damper 26 and the motor shaft 130' are in their normal center position, the snapaction switch arm 139c will be in engagement with the stationary contact 139a and the snapaction switch arm 138c will be in engagement with the stationary contact 138b. When the first zone 15 demands heat, the switch of the thermostat 132 will be closed, energizing the relay coil 135c and shifting the contact arms into engagement with the stationary contacts b associated with that relay. The circuit will be completed from the positive supply terminal 141 to motor terminal 140 through lead 143, contact 135–1b, stationary contact arm 135–1, lead 142, stationary contact arm 136–1 and stationary contact 136–1a, leads 144 and 145, snapaction switch contact 139a and arm 139c, and lead 148. Similarly, a circuit will be completed from the negative supply terminal 149 through leads 149a, 151 and 152 to the motor terminal 150. Since no circuit is established from terminal 149 to the direction control terminal 154 of the motor, the motor will be driven in a counterclockwise direction shifting the damper 26 to a position supplying the heated air output from the furnace to the zone 15. When the switch of thermostat 132 opens immediately upon achievement of the desired temperature in the zone 15, the movable contact arms of relay 135 drop back to the normal position. Since the contact arm 139c is at that time in engagement with stationary contact 139b because the motor shaft is off of its center position, a circuit is still completed between the terminal 141 through leads 143, 146 and 147 to the motor terminal 140. However, the contact arm 138c has been shifted into engagement with stationary contact 138b so that upon de-energizing of the relay 135, a circuit is established from the negative supply terminal 149 through lead 149a, contact arm 135–2 and stationary contact 135–2a, leads 170 and 171, snapaction switch contact 138a and arm 138c, and lead 174 to the direction control terminal 154, which reverses the internal connections from the terminals 140 and 150 to the armature and windings so as to cause the motor 130 to drive in a clockwise direction until it is de-energized by opening of the + supply circuit when the snapaction switch contact arm 139c shifts back to the stationary contact 139a at the center position of the damper.

The circuit paths can be similarly traced for the condition when relay 136 is energized responsive to heat demand signaled by the thermostat 133, by which the terminal 154 of the motor 130 is connected with the supply terminal 149 through the microswitch arm 138a and the stationary contact 138b, the circuit being operative to drive the motor so as to return the motor shaft and the damper 26 to the center position immediately upon deenergizing of the relay 136.

It will be apparent that upon energizing either of the relays 135 or 136, their associated contact arms 135–4 and 136–4 will be engaged with stationary contacts 135–4b or 136–4b to complete the energizing circuit to the burner fuel regulating valve 132.

A further modification is shown in FIGURES 5, 6, 7 and 8, wherein a commutator driven by the damper control motor and a pair of relays are assembled in a vastly simplified physical arrangement to provide for the desired control of the damper and the position of the damper control motor. This embodiment, like the preceding embodiment illustrated in FIGURE 4, provides for return of the damper to the intermediate position indicated by the broken lines 29 immediately upon opening of the thermostatic switch for the zone which has been demanding heat so that the residual heat forced from the bonnet of the furnace by the blower 19 following extinguishment of the burner until the time the blower motor is deenergized by the thermostatic switch 21 will be distributed to all of the zones served by the furnace. In this embodiment, the snapaction switches 38 and 39 or 138 and 139 of the previously described embodiments are dispensed with and a reversible motor indicated generally by the reference character 300 having a clockwise winding 301 and a counterclockwise winding 302 is controlled by means of a commutator unit 303 and a pair of relays 304 and 305 to accomplish the functions performed by the circuit illustrated in FIGURE 4. The coils 304a and 305a of the relays 304 and 305, which may for convenience be mounted on a rigid mounting panel 306 in laterally flanking relation to the commutator unit 303 are connected between ground and the stationary contacts of the thermostats 32 and 33 sensing the temperature in the zones 15 and 16 respectively. The armatures 304b and 305b of the relays 304 and 305 are pivoted on stationary pivot pins 304c and 305c fixed, for example, to the mounting panel 306 and providing horizontal axes of rotation for the relay armatures. The armatures 304b and 305b are provided with blocks of insulating material on which are fixed upper and lower pairs of contact fingers of a resilient construction, which may for example be electrically conductive leaf springs. The upper pair of contact fingers of the armature 304b are designated 304–1 and 304–2 and the lower pair of contact fingers are designated 304–3 and 304–4. Similarly, the upper pair of contact fingers on the relay armature 305b are designated 305–1 and 305–2 and the lower pair of contact fingers are designated 305–3 and 305–4.

The commutator 303 is formed of a sleeve of insulating material 307 having an inner bore 308 sized to freely fit over a shaft 309 which is geared to the shaft of the damper control motor 300 to be rotated in the same sense and extent as the shaft of the motor 300 to which the damper 26 is linked in the same manner as the preceding embodiments. The commutator sleeve 307 is adjustably fixed to the shaft 309 for rotation therewith by means of an annular disk 310 which is supported on and angularly adjustable about the axis of the commutator sleeve 307 by means of a pair of nut and slot connections 311, the disk 310 having a square hole in the center thereof, indicated at 312 which is adapted to fit over a similarly configurated end of the shaft 309. The shaft 309 may have an internally threaded aperture in the outer end thereof to receive a mounting nut, the head of which will retain the commutator sleeve on the shaft 309.

The commutator sleeve 307 carries on its outer surface a contact strip segment 313 which is aligned radially with the relay contact fingers 304–1 and 305–1, and which is connected with a pair of contact strip segments 314 and 315 which are aligned radially with the relay contact fingers 304–4 and 305–4, another contact strip segment 316 is aligned with the relay contact fingers 304–3, 305–3, a contact strip segment 317 is aligned with the relay contact fingers 304–2, 305–2 and another contact strip segment 318 is aligned with the relay contact fingers 304–4, 305–4. In one preferred embodiment, the circumferential extent of the contact strip segments 313 and 316 is 150°, the circumferential extent of the contact strip segments 317 and 318 is 50° and the circumferential extent of the contact strip segments 314 and 315 is 45° each. The strips 313 and 317 are located on the upper half of the commutator sleeve 307 in symmetrical relation to the vertical plane through the axis of the commutator sleeve and the remaining contact strips are on the lower half of the commutator sleeve in symmetrical relation to this vertical plane.

The contact strip 317 is electrically connected by a suitable lead, indicated by the reference character 320, and an external manual control switch 321 to a suitable + supply, indicated by the terminal 322, and contact strip 318 is connected by lead 323 directly to this + supply terminal 322. The contact strip 313 is electrically connected to the segments 314 and 315 by forming the same of a single piece of sheet material but are indicated schematically as being electrically connected in FIGURE 5 by the leads 324. The contact strip segment 316 is electrically connected by lead 324 to the fuel regulating valve 22 of the furnace 10.

The relay contact fingers 304–1 and 305–1 are connected directly by leads designated by the reference character 325 to the + supply terminal 322, and the relay contact fingers 304–3, 305–3 are directly connected to the furnace common or supply terminal 326 by leads 327. The relay contact fingers 304–2 and 305–4 are connected together by lead 328 and are thence connected by lead 329 to one end of the clockwise winding 301 of the damper control motor 300. The relay contact fingers 305–2 and 304–4 are connected together by lead 330 and are then connected by lead 331 to one end of the counterclockwise winding 302 of motor 300. The opposite ends of the motor windings 301 and 302 are connected by lead 332 to the negative voltage supply terminal 333.

In the operation of this damper control apparatus, assuming that the damper 26 and the shaft of the motor 300 and the commutator 303 connected therewith are all in their normal center position, and both of the relay coils 304 and 305 are deenergized, the armatures 304b, 305b of the relays will be in the elevated positions as illustrated in FIGURE 6 wherein the upper pairs of relay contact fingers 304–1 and 2 and 305–1 and 2 are lowered into engagement with the commutator 303, at which position the contact fingers 304–1, 305–1 engage the commutator contact strip 313 but the extent of the contact strip 317 is such that it is not engaged by the relay contact fingers 304–2, 305–2. When the first zone 15 demands heat, the switch of the thermostat 32 will be closed, energizing the relay coil 304 and shifting the relay armature 304b so that the contact finger 304–3 rises into contact with the commutator strip 316 completing the circuit to the fuel regulating valve 22 through the lead 324, and the contact finger 304–4 rises into contact with the commutator strip segment 314. The latter completes the circuit from the + supply terminal 322 to the counterclockwise winding 302 through the lead 325, contact finger 305–1, interconnected commutator strip segments 313 and 314, contact fingers 304–4 and lead 331. The motor 300 continues to be energized to drive in a counterclockwise direction and shift the damper 26 toward the position 28, until the contact finger 304–4 runs off of the contact strip segment 314 which terminates the supply to the motor windings and stops the motor. When the heat demand in zone 15 is satisfied, relay 304 is deenergized by the opening of the contacts in thermostat 32, contact finger 304–3 falls out of contact with the commutator strip segment 316 breaking the supply to the fuel regulating valve 22, and contact finger 304–2 falls into contact with commutator strip segment 317, completing a supply circuit from + terminal 322 through switch 321 and lead 320, and through leads 328 and 329 to the clockwise winding 301 to drive the motor in a clockwise direction until it reaches the middle or neutral position determined by the contact finger 304–2 riding off of the contact strip 317.

The damper control motor 300 will be similarly energized in a reversed sense to adjust the damper to supply all the heat output of the furnace to the zone 16 upon energizing of the relay 305 when the relay 304 is in deenergized condition, and the damper will be returned to the middle or neutral position immediately upon deenergizing of the relay 305 responsive to opening of the switch in the thermostat 33.

Figure 5:
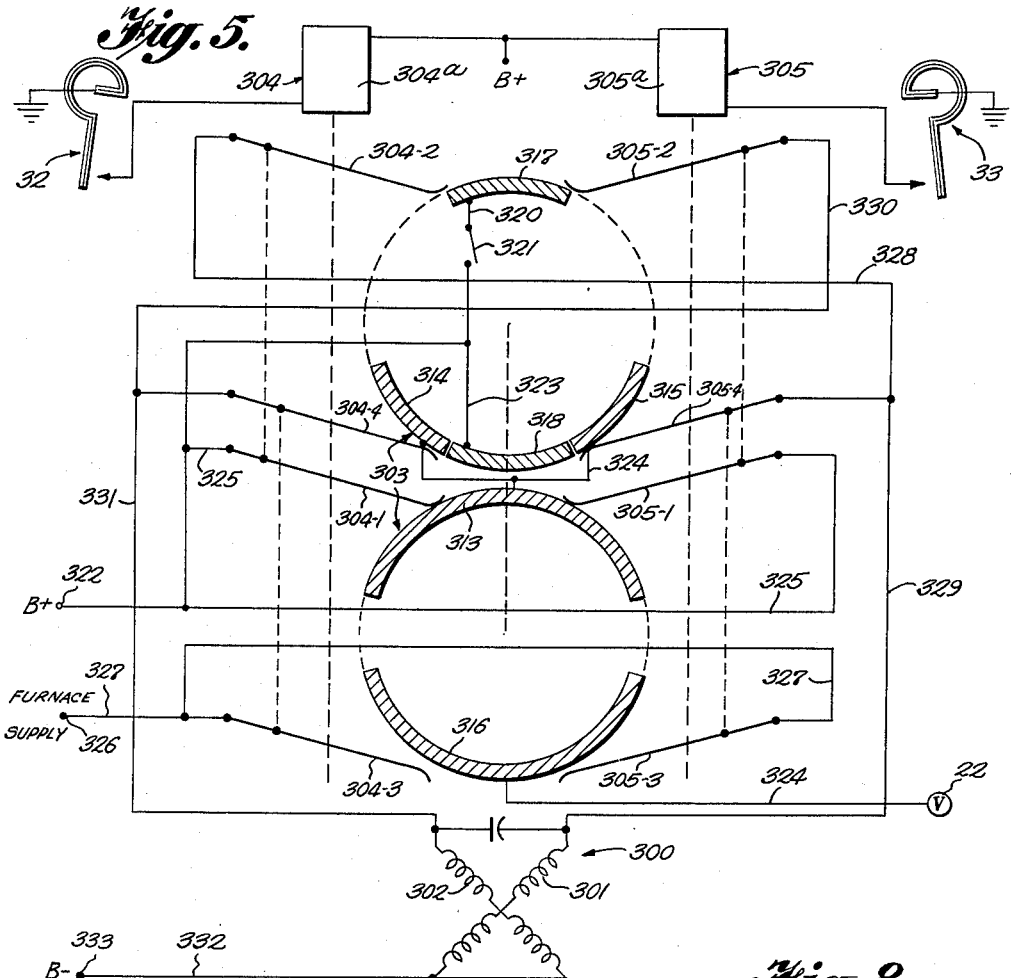
FIGURE 5 is a schematic diagram of still another embodiment of a control system of simplified construction for actuating and controlling an electric motor to adjust the damper in a manner similar to the control circuit of FIGURE 4.
Figure 7:
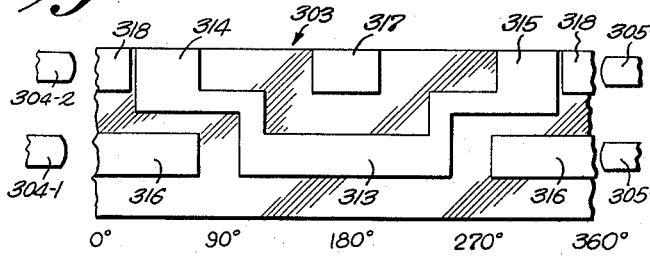
FIGURE 7 is a developed view of the commutator surface.
Figure 8:
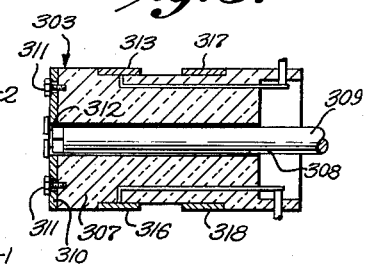
FIGURE 8 is a section view of the commutator member, taken along the line 7—7 of FIGURE 5.

It will also be apparent from a study of the schematic diagram of FIGURE 5 that if the zone 16 demands heat while the damper is still adjusted to supply all the heat to zone 15, in which condition the relay 304 will be in an energized state when the relay 305 is energized, the consequent movement of relay finger 305–1 out of contact with commutator strip segment 313 breaks the +supply to the commutator strip segment 314 and thus to the counterclockwise winding 302 of the motor, and the engagement of contact finger 305–4 with commutator strip segment 318 provides the +supply through the leads 323 and 329 to the clockwise winding 301 of the motor until the contact finger 305–4 runs off of commutator strip segment 318, causing the motor 300 to return in a clockwise direction to the center or neutral position.

The circumferential ranges of the various commutator strip segments described hereinbefore have been found satisfactory to accomplish the desired range of movement and centering of the damper control motor shaft and adjustment of the angular position of the commutator sleeve 307 is permitted by the nut and slot connections 311 between the adjusting disk 310 and the sleeve 307 to provide a fine adjustment of the commutator.

Figure 9:
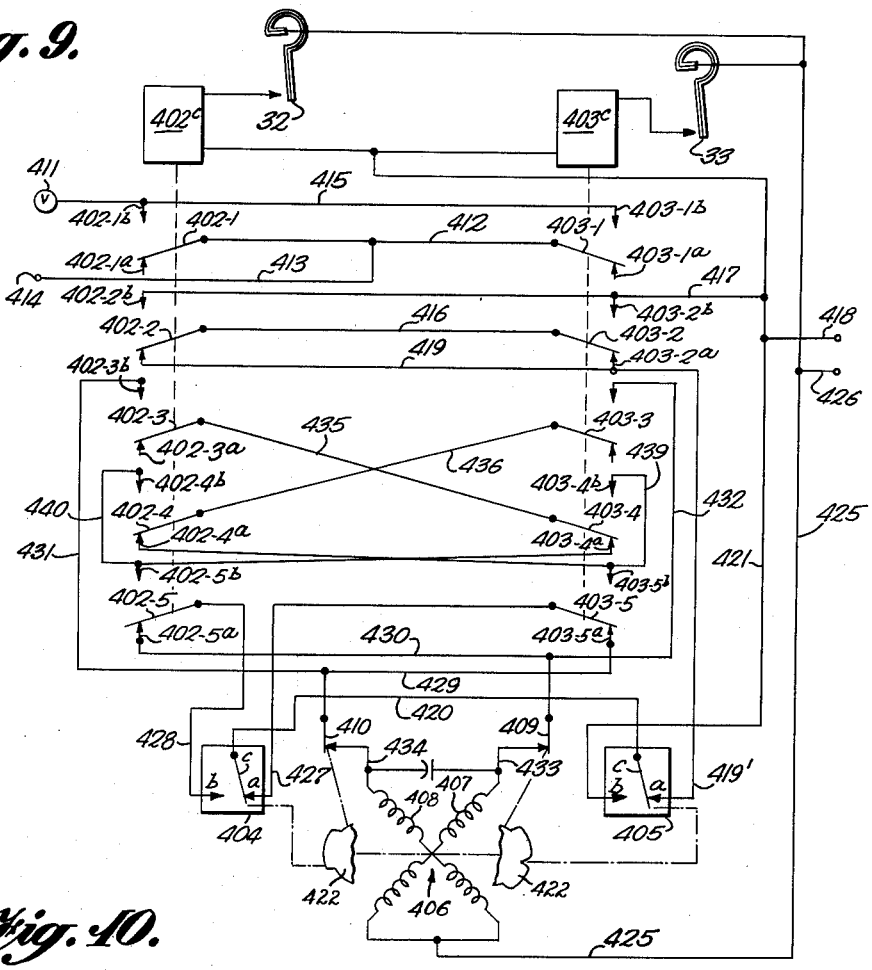
FIGURE 9 is a schematic diagram of yet another embodiment of an electrical control system for activating and controlling damper means in accordance with the present invention.
Figure 10:
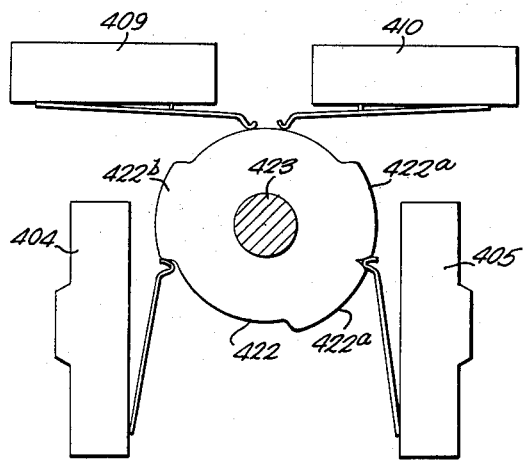
FIGURE 10 is a diagrammatic elevation view illustrating an exemplary motor driven cam and the physical arrangement of the cam switches and end switches therewith in the embodiment of FIGURE 9.

A still further modification is shown in FIGURES 9 and 10, wherein another simplified arrangement for achieving the desired automatic control of the damper and the positioning of the damper control motor is provided with a lobe cam and a pair of 5 pole, double-throw relays. This embodiment employs an inexpensive conventional motor instead of a reversible motor having internal cams and internal limit switches and provides for return of the damper to the intermediate position where air is distributed to all zones upon opening of the thermostatic switch for the zone which has been demanding heat, as in the embodiments of FIGURES 4 to 8. The control circuit 401 of this embodiment is similar in many respects to the circuit of FIGURE 4, as it includes a pair of five pole zone control relays 402, 403 for the first and second zones 15 and 16 respectively, each having five sets of contacts including movable contact arms designated by the postscript numerals 1, 2, 3, 4 and 5, normally closed stationary contacts designated by postscripts 1a to 5a, and normally open stationary contacts designated by postscripts 1b to 5b. The coils 402c, 403c of the zone control relays are connected in circuit with the thermostat 32 for zone 15 and the thermostat 33 for zone 16 as shown to effect energizing of the coils 402c, 403c when their associated zones demand heat. Cam actuated single-pole, double-throw switches 404, 405 corresponding generally to the switches 138, 139 of the FIGURE 4 embodiment, a reversible motor 406 having a clockwise winding 407 and a counterclockwise winding 408, and a pair of single-pole, single-throw end switches 409, 410 for controlling current supply to the motor windings to limit the travel thereof, are also provided.

The upper sets of contacts 402–1, 1a and 1b and 403–1, 1a and 1b control the burner control valve 411 in a manner similar to the contacts 135–4, 136–4 of the FIGURE 4 embodiment, the normally closed contacts 402–1a, 403–1b being idle, the movable contacts 402–1 and 403–1 being connected together by lead 412 which connects through lead 413 to the supply terminal 414, and the normally open stationary contacts 402–1b, 403–1b being connected together by lead 415 which connects to the burner control valve 411.

The next set of contacts 402–2, 2a and 2b and 403–2, 2a and 2b initiate the supply to the motor 406 through the cam switches 405 and 404. The movable contact arms 402–2, 402–3 are connected together by lead 416, the normally open stationary contacts 402–2b, 403–2b are connected together through lead 417 to one of the supply terminals 418, forming for example, one of the pair of 24 volt A.C. supply terminals, and the normally closed stationary contacts 402–2a, 403–2a are connected together through lead 419 which is connected by lead 419' to the stationary contact 405a of the single-pole, double-throw cam switch 405, the movable arm 405c of this cam switch being connected by lead 420 to the movable contact arm 404c of cam switch 404, and the other stationary contact 405b of the cam switch 405 being connected through lead 421 to the supply terminal 418. The switch 405, as shown in FIGURE 10, is controlled by a lobe cam 422 on the shaft 423 of motor 406, which cam has a lobe 422a in the preferred embodiment extending over an arc of about 110° along the cam periphery having a notch at approximately the center thereof. The cam follower of switch 405 enters the notch in the lobe 422a to position the contact arm c of switch 405 in engagement with contact 405a when the motor shaft is at the center position.

The supply to the upper ends of the motor windings 407, 408 after they are initially energized is controlled by the cam switches 404 and 405, the end switches 409, 410 and the contact sets associated with arms 402-3, 4 and 5 and 403-3, 4 and 5. The cam switch 404 is controlled by the lobe 422b having an arcuate extent of about 55° and has a movable contact arm 404c which is held in engagement with the stationary contact 404a at the clockwise limit of the shaft 423 and for just over half the range of arcuate movement of the shaft, and which engages the other stationary contact 404b at the counterclockwise limit and over the remaining part of the range of movement of the shaft. The movable contact arm 404c is connected through lead 420 with the cam switch arm 405c while the stationary contacts 404a and 404b are connected by leads 427, 428 with the zone control relay contact arms 403-5, 402-5 respectively. The normally closed stationary contacts 403-5a, 402-5a are connected through leads 429, 430 to the arms of end switches 410, 409, respectively and through leads 431, 432 with the normally open stationary contacts 402-3b and 403-3b. The stationary contacts of the end switches 409 and 410 are connected directly through leads 433, 434 to the clockwise and counterclockwise windings 407 and 408. The contact arms 402-3 and 403-3 are connected by crisscross leads 435, 436 with the contact arms 403-4 and 402-4 respectively, the normally closed contacts 402-4a and 403-4a are connected by leads 437, 438 with the normally open contacts 403-5b and 402-5b, and these contacts are connected by leads 439, 440 with normally open contacts 403-4b and 402-4b respectively. These connections are provided so that the contact sets associated with contact arms 402-3 to 5 and 403-3 to 5 serve to operate the motor 406 to drive the damper to the limit position in the proper direction when one of the zones demands heat, to bring the damper back to center position when both zones are demanding heat, and to bring the damper back to center position when neither zone demands heat. The lower ends of the motor windings 407, 408 are connected through lead 425 to the other terminal 426 of the 24 volt A.C. supply.

In the operation of this circuit, assuming that the damper 26 and the motor shaft 423 are in their normal or center position, the arm 404c of cam switch 404 will be in engagement with stationary contact 404a, both limit switches 409, 410 will be closed, and the arm 405c of cam switch 405 will be engaging contact 405a. When zone 15 demands heat, thermostat 32 closes the supply circuit to zone control relay coil 402c, causing the contact arms of relay 402 to shift into engagement with the normally open contacts 402-1b to 402-5b. Closure of contact arm 402-1 with contact 402-1b completes the supply circuit from terminal 414 through leads 413, 412 and 415 to the burner control valve 411 to activate the furnace to generate heat. Engagement of contact arm 402-2 with stationary contact 402-2b completes the circuit from the upper end of the counterclockwise motor winding 408 from terminal 418 through lead 417, contacts 402-2 and 2b, lead 416, contacts 403-2 and 2a, lead 419′, cam switch contact 405a and arm 405c, lead 420, cam switch arm 404c and contact 404a, lead 427, contacts 403-5 and 5a, lead 429, end switch 410, and lead 434, the lower end of the winding 408 being connected through lead 425 to the other 24 volt supply terminal 426. As soon as the motor 406 drives off of center position, cam switch arm 405c shifts into engagement with contact 405b and cam switch arm 404c shifts to contact 404b, supply being then continued to winding 408 through cam switch contact 405b and arm 405c, lead 420, cam switch arm 404c and contact 404b, lead 428, relay contact arm 402-5 and contact 402-5b, contacts 403-4 and 403-4a and 402-3 and 402-3b and lead 431. When the motor 406 drives the damper to the counterclockwise limit position, the lobe 422a of cam 422 engages and opens the normally closed end switch 410 and breaks the supply circuit to the motor winding 408, so that the damper remains in the counterclockwise limit position supplying heat to zone 15 until the demands of this zone are satisfied. When sufficient heat has been supplied to zone 15, the thermostat switch 32 opens, deenergizing zone control relay 402 and returning the contact arms 402-1 to 5 to the solid line position of FIGURE 9. Engagement of relay contact arm 402-5 with normally closed contact 402-5a completes a circuit from terminal 418 through lead 421, cam switch contacts 405b and c, lead 420, cam switch contacts 404b and c and lead 428 to lead 430, end switch 409, lead 433 and clockwise motor winding 407 to drive the motor 406 and damper in a clockwise direction until the notch of cam lobe 422a reaches the follower of cam switch 405, where the contact arm 405c shifts back to contact 405a breaking the supply circuit to motor winding 407 since relay contact arms 403-2 and 402-2 are both in open circuit relation to contacts 403-2b and 402-2b. The circuits associated with relay contact arms 403-2 to 403-5 serve corresponding functions to energize clockwise motor winding 407 when zone 16 demands heat and then counterclockwise motor winding 408 to return to center position when the demand of zone 16 is satisfied.

If zone 16 demands heat simultaneously with zone 15, the motor 406 is not activated to drive the cam 422 and damper off of center position, since no circuit from terminal 418 is established through the relay contact arms 402-2 and 403-2 and their associated stationary contacts to the motor windings 407, 408. However, the burner control valve 411 is energized through closure of the relay contact arms 402-1 and 403-1 with contacts 402-1b and 403-1b. If zone 16 demands heat after zone 15 but while relay coil 402c is still energized, clockwise motor winding 407 will immediately be energized to return the damper to center, as disengagement of relay contact arm 403-4 with contact 403-4a breaks the supply to the counterclockwise winding 408 if it was still energized and a supply circuit from terminal 418 to clockwise winding 407 through lead 421, cam switch contact 405b and arm 405c, lead 420, cam switch arm 404c and contact 404b, lead 428, relay arm 402-5 and contact 402-5b, lead 440, relay contact 402-4b and arm 402-4, lead 436, relay arms 403-3 and contact 403-3b, lead 432, end switch 409 and lead 433. The energizing circuit to the motor windings is broken when the motor shaft and damper reach center position by shifting of the cam switch arm 405c from contact 405b to 405a. For proper action, the cam switches and cam are adjusted so that the switch 405 trips before switch 404 is tripped in either direction.

It will be appreciated that a single damper as illustrated in FIGURE 1 need not be used, but that a pair of damper vanes pivoted at their centers on horizontal or vertical axes and located in the two branch ducts 12, 13 just outwardly of the juncture with the duct 11 may be used with equal facility. In such an installation, the damper vanes will occupy a normally center position wherein they are both inclined about 45° to the axis of the ducts 12, 13 and are linked together to the motor shaft of the damper control motor to drive one of the damper vanes into fully open position paralleling the duct axis and the other into fully closed position perpendicular to the duct axis on rotation of the motor shaft in one direction. The action of the damper vanes is reversed on driving of the motor shaft in the other direction.

While several preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. In a temperature control system for a building having a plurality of zones, temperature changing means for supplying a temperature conditioned medium to said zones, conduit means conveying the temperature conditioned medium to each of said zones for maintaining the temperature in each zone in a preselected range, a temperature responsive device in each of said zones responsive to the temperature of the air therein to produce a demand signal when the air temperature in its associated zone reaches a selected level, blower means for circulating the temperature conditioned medium through said conduit means to said zones, circuit means for operating said blower means during temperature conditioning periods when said temperature changing means is activated responsive to demand signals to generate temperature conditions in a selected range and for a post demand period following each said temperature conditioning period upon a cessation of said demand signals, flow control damper means in said conduit means adjustable to a plurality of positions in each of which the conditioned medium is admitted to at least one of said zones including a first zone position for delivering the temperature conditioned medium solely to a first one of said zones, a second zone position to deliver the medium solely to a second one of said zones, and adjustable to a distributing position delivering the medium to both said first and second zones in preselected relative proportions, electric motor means connected with said damper means for driving said damper means to said zone and distributing positions, and electrical circuit control means responsive to said temperature responsive devices to activate said temperature changing means and energize said motor means to drive said damper means to assume the first and second zone positions respectively when the temperature responsive devices in said first and second zones separately signal demand for said medium and to drive said damper means to said distributing position when the temperature responsive devices for said first and second zones concurrently signal demand for said medium, said control means including means responsive to cessation of demand signals for said medium from the temperature responsive devices to deactivate said temperature changing means and activate said motor means to drive said damper means to said distributing position without disrupting operation of said blower means, said circuit means for said blower means being independent of operation of said control means responsive to said cessation of demand signals to cause continued operation of said blower means to distribute conditioned medium at said temperature changing means to both zones during said post demand period.

2. In a temperature control system for a building having a plurality of zones, temperature changing means for supplying a temperature conditioned fluid medium to said zones, conduit means for conveying the temperature conditioned medium to each of said zones for maintaining the temperature in each zone in a preselected range, a temperature responsive device in each of said zones responsive to the temperature of the air therein to assume a demand and a satisfied condition when the air temperature in its associated zone is respectively below and above a selected level; blower means for circulating the temperature conditioned medium through said conduit means to said zones, circuit means for operating said blower means during temperature conditioning periods when said temperature changing means is activated responsive to demand signals to generate temperature conditions in a selected range and for a post demand period following each said temperature conditioning period upon a cessation of said demand signals, the improvement comprising flow control damper means in said conduit means adjustable to a plurality of positions in each of which the conditioned medium is admitted to at least one of the said zones including a first zone position for delivering the temperature conditioned medium solely to a first one of said zones, a second zone position to deliver the medium solely to a second one of said zones, and a distributing position delivering the medium to both said first and second zones in preselected relative proportions, electric motor means for rapidly driving said damper means to said zone and distributing positions, and electrical circuit control means responsive to signals denoting the conditions of said temperature responsive devices to activate said temperature changing means and energize said motor means to drive said damper means to the first and second zone positions respectively when the temperature responsive device in said first and second zones separately assume said demand condition and to drive said damper means to said distributing position when the temperature responsive devices for said first and second zones concurrently assume said demand condition, said control means including means responsive to the temperature responsive devices concurrent occupying said satisfied condition upon cessation of demand signals from said temperature changing means to deactivate said temperature changing means and activate said motor means to drive said damper means to said distributing position immediately upon attainment of the concurrently satisfied condition without disrupting operation of said blower means, said circuit means for said blower means being independent of operation of said control means responsive to said cessation of demand signals to cause continued operation of said blower means to distribute conditioned medium at said temperature changing means to both zones during said post demand period.

3. In a temperature control system of the forced air recirculation type for a building having first and second zones, intermittently operable air heating means for supplying heated air to said zones including a bonnet chamber in which air is heated, ductwork means leading from said bonnet chamber to said zones, a thermostat in each of said zones responsive to the temperature of the air therein to produce a demand signal when the air temperature in its associated zone is below a selected level, air blower means for circulating heated air from said bonnet chamber through said ductwork means to said zones, circuit means for said blower means including temperature controlled switch means responsive to the air temperature in said bonnet chamber to energize said air blower means when the bonnet air temperature reaches a selected level during operation of the air heating means and maintain the air blower means energized until the bonnet air temperature drops to a selected cut-off level following cessation of each air heating means operation, motorized damper means in said ductwork means adjustable to a plurality of positions in each of which the heated air is admitted to at least one of said zones including a first zone position for delivering the heated air solely to said first zone, a second zone position for delivering the heated air solely to said second zone, and a distributing position delivering the heated air to both of said zones, electric motor means connected with said damper means for driving said damper means to said first and second zone positions and said distributing position, and electrical circuit control means responsive to said thermostats to activate said air heating means and energize said motor means to drive said damper means to said first and second zone positions respectively when the thermostats in said first and second zones separately signal demand for heated air and to drive said damper means to said distributing position when the thermostats for said first and second zones concurrently signal demand for heated air, said control means including means immediately responsive to cessation of demand signals for heated air when only one thermostat has been producing demand signals to deactivate said air heating means and energize said motor means to drive said damper means to said distributing position without disrupting operation of said air blower means, said circuit means for said blower means being independent of response of said control means to said cessation of demand signals to permit continued operation of said blower means to distribute residual heated air in said bonnet chamber to both zones until the bonnet air temperature drops to said cut-off level.

4. In a temperature control system of the forced air recirculation type for a building having first and second zones, intermittently operable air heating means for supplying heated air to said zones including a bonnet chamber in which air is heated, ductwork means leading from said bonnet chamber to said zones, a thermostat in each of said zones responsive to the temperature of the air therein to produce a demand signal when the air temperature in its associated zone is below a selected level, air blower means for circulating heated air from said bonnet chamber through said ductwork means to said zones, circuit means for said blower means including temperature controlled switch means responsive to the air temperature in said bonnet chamber to energize said air blower means when the bonnet air temperature reaches a selected level during operation of the air heating means and maintain the air blower means energized until the bonnet air temperature drops to a selected cut-off level following cessation of each air heating means operation, motorized damper means in said ductwork means adjustable to a plurality of positions in each of which the heated air is admitted to at least one of said zones including a first zone position for delivering the heated air solely to said first zone, a second zone position for delivering the heated air solely to said second zone, and a distributing position delivering the heated air to both of said zones, electric motor means connected with said damper means for driving said damper means to said first and second zone positions and said distributing position, and electrical circuit control means responsive to said thermostats to activate said air heating means and energize said motor means to drive said damper means to said first and second zone positions respectively when the thermostats in said first and second zones separately signal demand for heated air and to drive said damper means to said distributing position when the thermostats for said first and second zones concurrently signal demand for heated air, said control means including means immediately responsive to cessation of demand signals for heated air when only one thermostat has been producing demand signals to deactivate said air heating means and energize said motor means to drive said damper means to said distributing position without disrupting operation of said air blower means, said circuit means for said blower means being independent of response of said control means to said cessation of demand signals to permit continued operation of said blower means to distribute residual heated air in said bonnet chamber to both zones until the bonnet air temperature drops to said cut-off level, said electric circuit control means comprising a pair of normally de-energized plural contact relays each having a relay coil respectively coupled to an associated one of said thermostats to be energized when the respective thermostats signal demand for heat, and circuit means interconnecting said contacts of said relays with each other and with said motor means and said heating means to activate and deactivate said heating means and energize said motor means as recited.

5. In a temperature control system for a building having a plurality of zones, temperature changing means for supplying a temperature conditioned medium to said zones, conduit means for conveying the temperature conditioned medium to each of said zones for maintaining the temperature in each zone in a pre-selected range, a temperature responsive device in each of said zones responsive to the temperature of the air therein to produce a demand signal when the air temperature in its associated zone reaches a selected level, blower means for circulating the temperature conditioned medium through said conduit means to said zones, circuit means for operating said blower means during temperature conditioning periods when said temperature changing means is activated responsive to demand signals to generate temperature conditions in a selected range and for a post demand period following each said temperature conditioning period upon a cessation of said demand signals, flow control damper means in said conduit means adjustable to a plurality of positions in each of which the conditioned medium is admitted to at least one of said zones including a first zone position for delivering the temperature conditioned medium solely to a first one of said zones, a second zone position to deliver the medium solely to a second one of said zones, and adjustable to a distributing position delivering the medium to both said first and second zones in pre-selected relative proportions, electric motor means connected with said damper means for driving said damper means to said zone and distributing positions, and electrical circuit control means responsive to said temperature responsive devices to activate said temperature changing means and energize said motor means to drive said damper means to assume the first and second zone positions respectively when the temperature responsive devices in said first and second zones separately signal demand for said medium and to drive said damper means to said distributing position when the temperature responsive devices for said first and second zones concurrently signal demand for said medium, said control means including means responsive to cessation of demand signals for said medium from the temperature responsive devices to deactivate said temperature changing means and to activate said motor means to drive said damper means to said distributing position without disrupting operation of said blower means, said circuit means for said blower means being independent of operation of said control means responsive to said cessation of demand signals to cause continued operation of said blower means to distribute conditioned medium at said temperature changing means to both zones during said post demand period, said electric circuit control means comprising a pair of normally de-energized plural contact relays each having a relay coil respectively coupled to an associated one of said temperature responsive devices to be energized when the respective temperature responsive devices signal demand for said medium, and circuit means interconnecting said contacts of said relays with each other and with said motor means and said temperature changing means to activate and deactivate said temperature changing means and energize said motor means as recited.

6. In a temperature control system for a building having a plurality of separate zones, heat exchange means for supplying a quantity of conditioned air to said zones, conduit means connecting said heat exchange means to said zones to deliver conditioned air thereto for maintaining the temperature of each zone at a predetermined value, a temperature responsive device in each of said zones responsive to the temperature of the air therein to produce a demand signal when the air temperature in its associated zone is below a selected level, flow control damper means in said conduit means adjustable to a plurality of positions each of which admits conditioned air to at least one of said zones including a first zone position delivering conditioned air solely to a first one of said zones and a second zone position delivering conditioned air solely to a second one of said zones and a third distributing position intermediate said first and second zone positions delivering conditioned air to both said first and second zones in preselected relative proportions, a reversible electric motor having a rotatable shaft angularly adjustable to two angularly spaced limit positions and over a selected arcuate range therebetween, means interconnecting said motor shaft with said damper means for positioning said damper means in accordance with the position of said motor shaft, and electrical circuit control means responsive to said temperature responsive devices for conditioning said motor to cause said damper means to occupy one of said first, second and third positions when not in transit therebetween including means responsive to a demand signal from either of said temperature responsive devices for driving said motor to one of said limit positions to drive said damper means to the first and second zone positions respectively when the air temperature in said first and second zones is below the selected level and means responsive to demand signals concurrently from both of said temperature responsive devices for adjusting said motor to a selected intermediate angular position between said limit positions and drive said damper means to said distributing position.

7. In a temperature control system for a building having a plurality of separate zones, heat exchange means for supplying a quantity of conditioned air to said zones, conduit means connecting said heat exchange means to said zones to deliver conditioned air thereto for maintaining the temperature of each zone at a predetermined value, a temperature responsive device in each of said zones responsive to the temperature of the air therein to produce a demand signal when the air temperature in its associated zone is below a selected level, flow control damper means in said conduit means adjustable to a plurality of positions including a first zone position delivering conditioned air solely to a first one of said zones and a second zone position delivering conditioned air solely to a second one of said zones and a third distributing position intermediate said first and second zone positions delivering conditioned air to both said first and second zones in preselected relative proportions, a reversible electric motor having two supply voltage terminals and a reversing terminal and having a rotatable shaft adjustable to either of two angularly spaced limit positions and rotatable over a selected arcuate range therebetween, means interconnecting said motor shaft with said damper means to drive said damper means to said first, second and third zone positions upon adjustment of said motor shaft to one of said limit positions or a selected intermediate position therebetween, and electrical control circuit means including a pair of multicontact relays each energized responsive to a demand signal from a respective one of said temperature responsive devices, said relays having contacts for completing a supply circuit to said two supply voltage terminals when the associated temperature responsive device produces a demand signal, at least one of said relays including contacts for applying voltage to said reversing terminal to cause said motor shaft to rotate in a reverse direction, and means responsive to the angular position of said motor shaft and intercoupled with contacts of said relays regulating the supply voltage to one of said supply voltage terminals of said motor for deenergizing said motor when the motor shaft reaches said intermediate position when both of said relays are concurrently energized.

8. In a temperature control system, the combination recited in claim 7, wherein said heat exchange means includes two stage units for conditioning air supplied by said heat exchange means, and said circuit control means including contacts of said relays and stage relay means intercoupled with said two stage units to activate one of said stage units when only one of said temperature responsive devices produces a demand signal and to activate both of said stage units when the temperature responsive devices for said first and second zones concurrently produce demand signals.

9. In a temperature control system for a building having first and second separate zones, furnace means for supplying a quantity of heated air to said zones, conduit means connecting said furnace means to said zones to deliver heated air thereto for maintaining the temperature of each zone at a predetermined value, a thermostat in each of said zones responsive to the temperature of the air therein to produce a demand signal when the air temperature in its associated zone is below a selected level, flow control damper means in said conduit means adjustable to a plurality of positions each of which admits heated air to at least one of said zones including a first zone position delivering heated air solely to said first zone and a second zone position delivering heated air solely to said second zone and a third air dividing position intermediate said first and second zone positions delivering heated air to both said first and second zones in preselected relative proportions, three-position electric motor means for adjusting said damper means including a reversible electric motor having a rotatable shaft angularly adjustable to two angularly spaced limit positions and over a selected arcuate range therebetween, means interconnecting said motor shaft with said damper means for continuously positioning said damper means in accordance with the position of said motor shaft, and electric circuit control means responsive to said thermostats for conditioning said motor to cause said damper means to occupy one of said first, second and third positions when not in transit therebetween including means responsive to a demand signal from either of said thermostats for driving said motor to one of said limit positions to drive said damper means to the first and second zone positions respectively when the air temperature in said first and second zones is below the selected level and means responsive to demand signals concurrently from both of said thermostats for adjusting said motor to a selected intermediate angular position between said limit positions and drive said damper to said distributing position.

10. In a temperature control system for a building having first and second separate zones, furnace means for supplying a quantity of heated air to said zones, including two stage burners each having an electrically operated valve for individually regulating activation of said burners, conduit means for connecting said furnace means to said zones to deliver heated air thereto for maintaining the temperature of each zone at a predetermined value, a thermostat in each of said zones responsive to the temperature of the air therein to produce a demand signal when the air temperature in its associated zone is below a selected level, flow control damper means in said conduit means adjustable to a plurality of positions each of which admits heated air to at least one of said zones including a first zone position delivering heated air solely to said first zone and a second zone position delivering heated air solely to said second zone and a third air dividing position intermediate said first and second zone positions delivering heated air to both said first and second zones in preselected relative proportions, a reversible electric motor having two supply voltage terminals and a reversing terminal and having a rotatable shaft adjustable to either of two angularly spaced limit positions and rotatable over a selected arcuate range therebetween, means interconnecting said motor shaft with said damper means to drive said damper means to said first, second and third damper positions upon adjustment of said motor shaft to one of said limit positions or a selected intermediate position therebetween, an electrical control circuit means including a pair of multicontact relays each energized responsive to a demand signal from a respective one of said thermostats, said relays having contacts for completing a supply circuit to said two supply voltage terminals when the associated thermostat produces a demand signal, at least one of said relays including contacts for applying voltage to said reversing terminal to cause said motor shaft to rotate in a reverse direction, and means including another relay responsive to demand signals from one of said thermostats and other contacts of said first mentioned relays for controlling said values to activate only one of said stage burners when only one of said thermostats produces a demand signal and to actuate both of said stage burners when the thermostats for said first and second zones concurrently produce demand signals.

11. In a temperature control system for a building having a plurality of separate zones, heat exchange means for supplying a quantity of conditioned air to said zones, conduit means connecting said heat exchange means to said zones to deliver conditioned air thereto for maintaining the temperature of each zone at a predetermined value, a temperature responsive device in each of said zones responsive to the temperature of the air therein to produce a demand signal when the air temperature in its associated zone is below a selected level, blower means for circulating the temperature conditioned medium through said conduit means during predetermined operation of said heat exchange means in a selected operating range, means operating said blower means during occurrence of demand signals from any of said zones concurring with said predetermined operation of said heat exchange means and for at least a post demand period after cessation of any of the last-mentioned demand signals, flow control damper means in said conduit means adjustable to a plurality of positions each of which admits conditioned air to at least one of said zones including a first zone position delivering conditioned air solely to a first one of said zones and a second zone position delivering conditioned air solely to a second one of said zones and a third distributing position intermediate said first and second zone positions delivering conditioned air to both said first and second zones in preselected relative proportions, a reversible electric motor having a rotatable shaft, means interconnecting said motor shaft with said damper means for positioning said damper means in accordance with the position of said motor shaft, and electrical circuit control means responsive to said temperature responsive devices for energizing said motor including means responsive to a demand signal from the temperature responsive device associated with said first zone for rotating said motor through a selected arc in a first direction to adjust said damper means to said first zone position, means responsive to a demand signal from the temperature responsive device associated with said second zone rotating said motor through a selected arc in a second direction opposite to said first direction to adjust said damper means to said second zone position, means responsive to termination of the demand signal for returning the motor to a selected intermediate position between said limit positions to drive said damper to said distributing position, and means responsive to demand signals from either of said temperature responsive devices during the occurrence of demand signals from the other temperature responsive device for adjusting said motor to said intermediate position without disrupting operation of said blower means whereby condition medium is distributed to all of said zones during said post demand period of operation of said blower means.

12. In a temperature control system for a building having a plurality of zones, temperature changing means for changing the temperature of a fluid medium, conduit means for conveying the temperature conditioned medium to each of said zones including a branch conduit individual to each of said zones connecting its respective zone with the temperature changing means, a temperature responsive device in each of said zones responsive to the temperature of the air therein for signalling demand for the temperature conditioned medium by its respective zone, blower means for circulating the temperature conditioned medium through said conduit means during predetermined operation of said temperature changing means in a selected operating range, means operating said blower means during occurrence of demand signals from any of said zones concurring with said predetermined operation of said temperature changing means and for a post demand period after cessation of the last-mentioned demand signals, flow control damper means in said conduit means adjustable to a plurality of positions each of which admits air to at least one of said zones including a first limit position for delivering the temperature conditioned medium solely to a first one of said zones, a second limit position to deliver the medium solely to a second one of said zones, and adjustable to a distributing position delivering the medium to both said first and second zones in preselected relative proportions, motor means for driving said damper means to said limit and distributing positions, and electrical circuit control means responsive to said temperature responsive devices to activate said motor means to drive said damper means to the first and second limit positions respectively when the temperature responsive device in said first and second zones separately demand said medium and to drive said damper means to said distributing position when the temperature responsive device for said first and second zones concurrently signal demands for said medium, said control means including means responsive to termination of demand for said medium by the temperature responsive devices to activate said motor means to return said damper means to said distributing position without disrupting operation of said blower means whereby conditional medium is distributed to all of said zones during said post demand period of operation of said blower means, said control means including a rotatable commutator driven in coordinated relation to said motor means having a plurality of arcuate conductive strip segments peripherally disposed thereon and a pair of normally deenergized relays respectively controlled by said temperature responsive devices each having contact fingers supported on a pivoted relay armature for movement into and out of engagement with the segments, said segments having circumferential lengths regulating the angular range of movement of the motor means responsive to demand signals from said temperature responsive devices.

13. The combination recited in claim 11, wherein said control means includes a rotatable commutator driven in coordinated relation to said motor means having a plurality of arcuate conductive strip segments peripherally disposed thereon and a pair of normally deenergized relays respectively controlled by said temperature responsive devices, each having contact fingers supported on a pivoted relay armature for movement into and out of engagement with the segments, said segments having circumferential lengths regulating the angular range of movement of the motor means responsive to demand signals from said temperature responsive devices.

14. In a temperature control system for a building having a plurality of zones, temperature changing means for changing the temperature of a fluid medium, conduit means for conveying the temperature conditioned medium to each of said zones including a branch conduit individual to each of said zones connecting its respective zone with the temperature changing means, a temperature responsive device in each of said zones responsive to the temperature of the air therein for signalling demand for the temperature conditioned medium by its respective zone, flow control damper means in said conduit means adjustable to a plurality of positions each of which admits temperature conditioned medium to at least one of said zones including a first limit position for delivering the temperature conditioned medium solely to a first one of said zones, a second limit position to deliver the medium solely to a second one of said zones, and adjustable to an intermediate position delivering the medium to both said first and second zones in preselected relative proportions, reversible motor means having clockwise and counterclockwise windings for driving said damper means to said limit and intermediate positions, and electrical circuit control means responsive to said temperature responsive devices to activate said motor means to drive said damper means to the first and second limit positions respectively when the temperature responsive device in said first and second zones separately demand said medium and to drive said damper means to said intermediate position when the temperature responsive device for said first and second zones concurrently signal demands for said medium, said control means including means responsive to termination of demand for said medium by the temperature responsive devices to activate said motor means to return said damper means to said intermediate position, said electrical circuit control means including a pair of normally de-energized plural pole double-throw relays each having a relay coil respectively coupled to an associated one of said temperature responsive devices to be energized when the latter signals demand for heat, a lobe cam coupled to said motor means for rotation therewith having a pair of lobe formations, a pair of double pole double throw switches having cam followers riding on opposite portions of said lobe cam to be activated thereby, one of said lobe formations activating one of said switches to assume one throw position permitting energization of said motor only when one of said relays is energized when said cam occupies a selected intermediate position and to assume the other throw position at all other angular positions of said cam, the other of said lobe formations activating the other switch to regulate activation of said windings in preselected relation to the angular position of said cam and the condition of said relays, and a pair of end switches coupled respectively with said motor windings having cam followers activated by said lobe cam to terminate energization of said windings when said cam reaches angular positions corresponding to said first and second limit positions.

References Cited by the Examiner
UNITED STATES PATENTS

| | | |
|---|---|---|
| 2,015,960 | 10/35 | Norris. |
| 2,109,649 | 3/38 | Rather. |
| 2,223,287 | 11/40 | Kingsland _____ 236—1 |
| 2,244,631 | 6/41 | Nessell _____ 236—9 |
| 2,271,120 | 1/42 | Grant _____ 236—11 |
| 2,290,066 | 7/42 | Nessel _____ 236—9 |
| 2,290,757 | 7/42 | Lawler _____ 236—11 |
| 2,488,185 | 11/49 | Gillick et al. _____ 236—1 |
| 2,726,362 | 12/55 | Busch _____ 318—202 |
| 3,083,327 | 3/63 | Byloff _____ 318—202 |

EDWARD J. MICHAEL, *Primary Examiner.*